(12) United States Patent
Anderson

(10) Patent No.: US 6,266,215 B1
(45) Date of Patent: Jul. 24, 2001

(54) TAPE DRIVE HEAD ASSEMBLY AND APPARATUS FOR MOUNTING A TAPE DRIVE HEAD TO A CARRIAGE

(75) Inventor: James C. Anderson, Eagle, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/150,490

(22) Filed: Sep. 9, 1998

(51) Int. Cl.⁷ .............................. G11B 5/56; G11B 21/24
(52) U.S. Cl. ............................................................ 360/291
(58) Field of Search ................................... 360/104, 251.1, 360/260, 261.1, 261.3, 270, 290, 241, 291.2, 291

(56) References Cited

U.S. PATENT DOCUMENTS

| Re. 33,661 | * | 8/1991 | Baheri ................................. 360/106 |
| 3,649,774 | | 3/1972 | Olah et al. ......................... 360/291.3 |
| 4,586,098 | * | 4/1986 | Pretto ................................. 360/109 |
| 4,605,978 | * | 8/1986 | Zeavin ............................... 360/104 |
| 4,811,141 | * | 3/1989 | McConica et al. ................. 360/110 |
| 5,157,245 | * | 10/1992 | Shigeno et al. .................... 235/449 |
| 5,191,495 | | 3/1993 | Takahara ........................... 360/261.3 |
| 5,644,453 | * | 7/1997 | Eckberg et al. .................... 360/106 |
| 5,856,896 | * | 1/1999 | Berg et al. ......................... 360/104 |
| 5,898,541 | * | 4/1999 | Boutaghou et al. ................ 360/109 |

FOREIGN PATENT DOCUMENTS

| 58060426 | 4/1983 | (JP) . |
| 63053712 | 3/1988 | (JP) . |

* cited by examiner

*Primary Examiner*—David L. Ometz
*Assistant Examiner*—Julie Anne Watko

(57) ABSTRACT

An apparatus and method for mounting a tape drive head to a carriage that supports the head on the actuator. The method includes the steps of providing an inside corner on either the head or the carriage, providing a mating outside corner on the other of the head or the carriage, drawing the outside corner into the inside corner, and fastening the head to the carriage. The apparatus includes an inside corner on either the head or the carriage, a mating outside corner on the other of the head or the carriage, and a fastener that secures the head to the carriage. The inside and outside corners are configured to fit together when the head is fastened to the carriage. Preferably, the fastener is configured to pull the outside corner into the inside corner as the head is fastened to the carriage. This may be achieved, for example, by angling the fastener toward the inside corner.

7 Claims, 5 Drawing Sheets

TAPE DRIVE HEAD ASSEMBLY AND APPARATUS FOR MOUNTING A TAPE DRIVE HEAD TO A CARRIAGE

FIELD OF THE INVENTION

The present invention relates generally to tape drives, and more particularly to a system for mounting a read/write head to a carriage or other support structure.

BACKGROUND OF THE INVENTION

Information is recorded on and read from a moving magnetic tape with a magnetic read/write head positioned next to the tape. The magnetic "head" may be a single head or, as is common, a series of read/write head elements stacked individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction that the tape travels. The head elements are positioned as close to the center of a track as possible based upon the servo information recorded on the tape.

The head elements must be precisely positioned relative to the tape for the tape drive to operate properly. Ideally, the position of the head elements relative to the tape in the azimuth, yaw and zenith rotational directions does not change. The rotational position or "alignment" of the head elements is typically set during the manufacture of the tape drive. The head elements should move in only one direction, as described above, straight (usually up and down) across the width of the tape. Once the head elements are aligned, even small rotational movements of the head or the head elements may cause misalignment and higher incidences of read and write errors. Maintaining the pre-set alignment in the azimuth direction is particularly important for head assemblies in which a read element is positioned immediately downstream of a write element so that the read element can accurately check data as it is written. Alignment in the azimuth direction is often the most difficult to maintain because the head is usually mounted to a vertical face on the supporting carriage. This surface mount provides inherent stability in the zenith and yaw directions, but not in the azimuth directions.

SUMMARY OF THE INVENTION

Accordingly, the present invention is directed to a method and apparatus for mounting a tape drive head to a supporting carriage to minimize movement of the head in the azimuth direction and help maintain the pre-set alignment of the head and head elements. The method includes the steps of providing an inside corner on either the head or the carriage, providing a mating outside corner on the other of the head or the carriage, drawing the outside corner into the inside corner, and fastening the head to the carriage. The apparatus includes an inside corner on either the head or the carriage, a mating outside corner on the other of the head or the carriage, and a fastener that secures the head to the carriage. The inside and outside corners are configured to fit together when the head is fastened to the carriage. Preferably, the fastener is configured to pull the outside corner into the inside corner as the head is fastened to the carriage. This may be achieved, for example, by angling the fastener toward the inside corner.

DETAILED DESCRIPTION OF THE INVENTION

Figure 1:
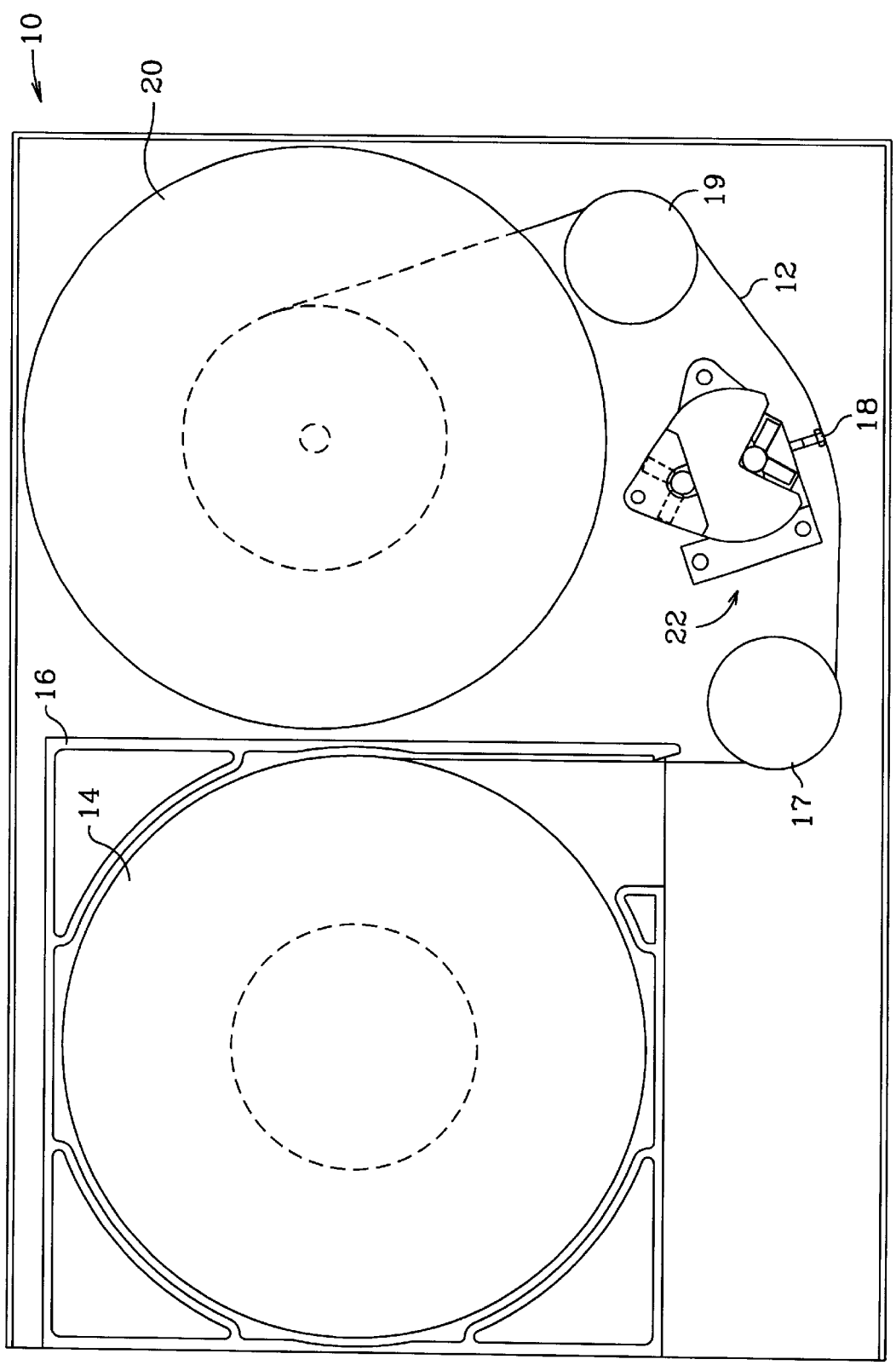
FIG. 1 is a top down plan view of a tape drive that may be adapted for use with the mounting system of the present invention.

Referring to FIG. 1, a magnetic tape 12 is wound on a single supply spool 14 in tape cartridge 16. Tape cartridge 16 is inserted into tape drive 10 for read and write operations. Tape 12 passes around tape guide 17, over a magnetic read/write head 18, around tape guide 19 to take up spool 20. Head 18 is mounted to an actuator that includes a variety of operational features related to head 18. Magnetic head 18 engages tape 12 as tape 12 moves across the face of head 18 to record data on tape 12 and to read data from tape 12.

Figure 2:
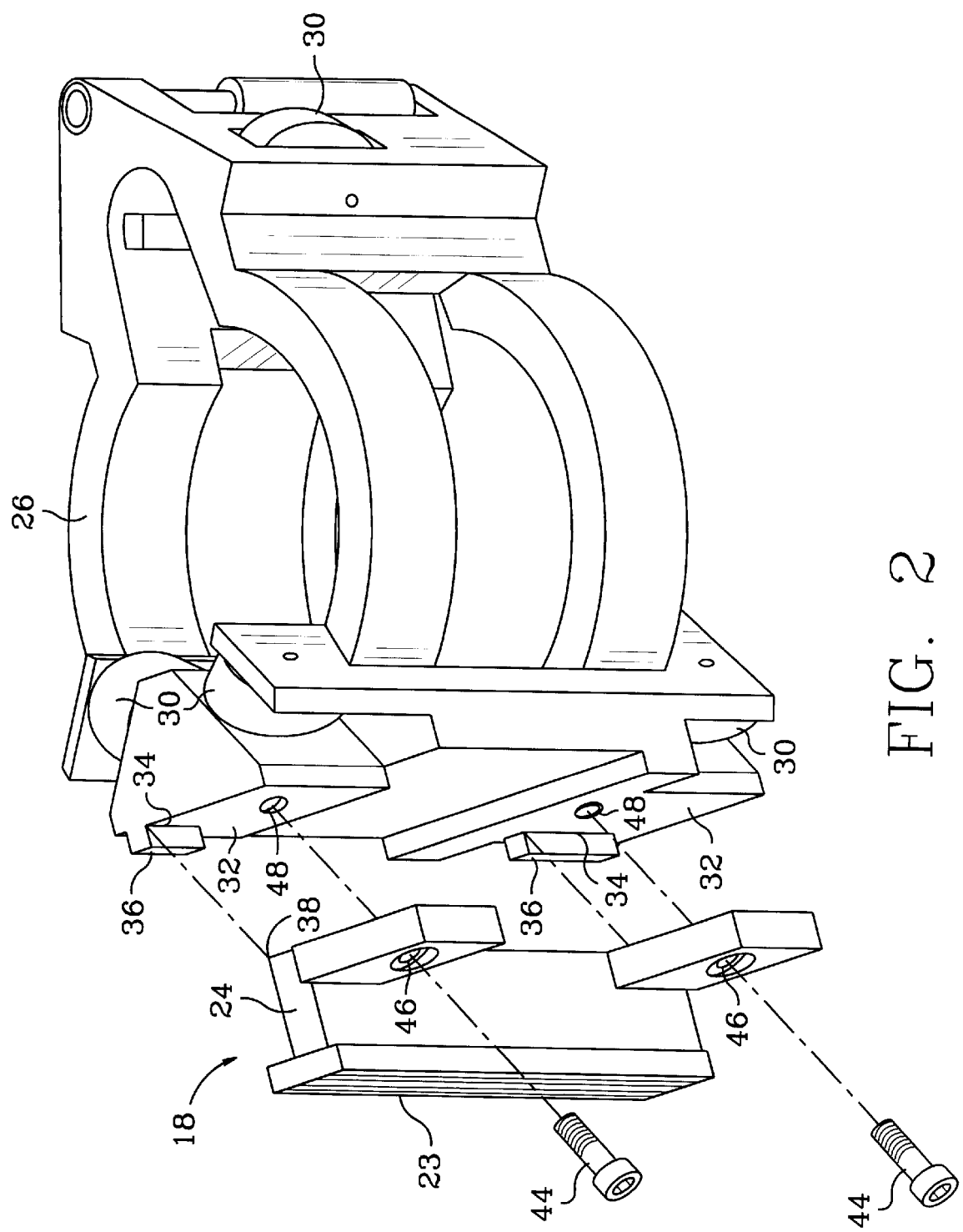
FIG. 2 is a front left exploded perspective view of a tape drive read/write head mounted to a carriage showing the corner mount and angled fastener of one embodiment of the invention.
Figure 3:
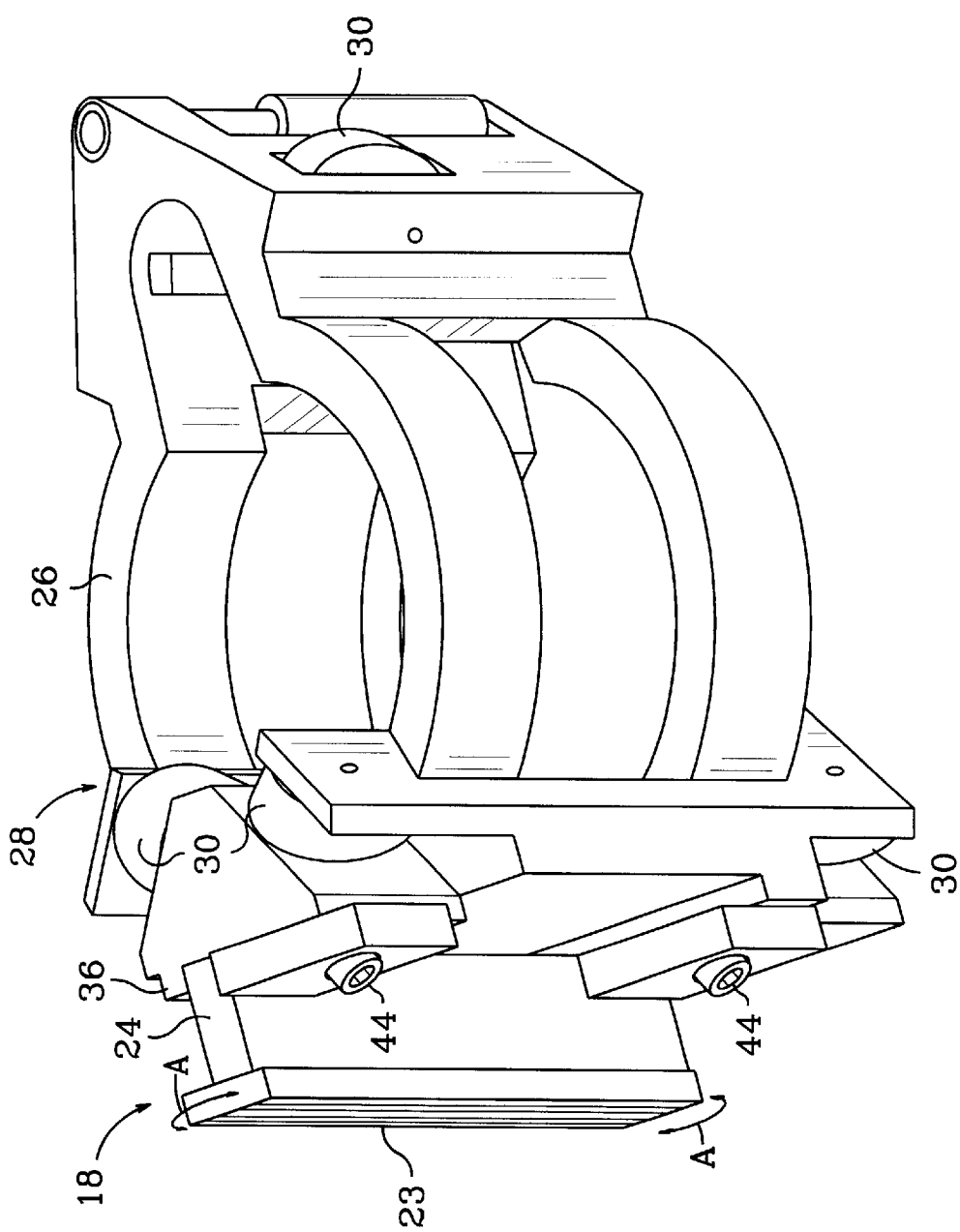
FIG. 3 is an assembled perspective view of the head and carriage assembly of FIG. 2.
Figure 4:
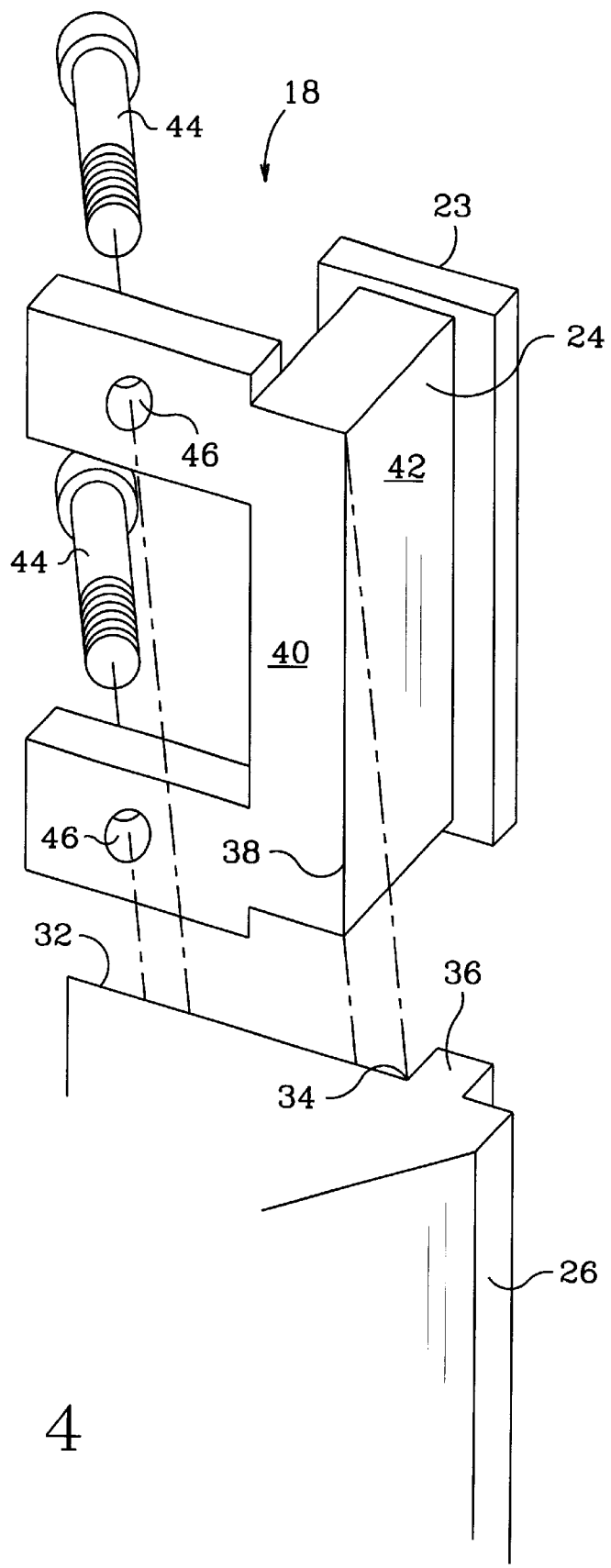
FIG. 4 is a front right exploded detail perspective view of the assembly of FIG. 2 showing an outside corner on the head that fits into a mating inside corner on the carriage.

FIG. 2 is an exploded perspective view of read/write head 18 and head carrier 24 mounted to a carriage 26. FIG. 3 is an assembled perspective view of the head carrier and carriage assembly 28 of FIG. 2. FIGS. 2 and 3 show the front left portions of assembly 28. FIG. 4, which is an exploded detail perspective view of assembly 28, shows the front right portion of the assembly. Carriage 26 and actuator 22 are described in detail in the commonly owned U.S. patent application Ser. No. 09/102,703, filed Jun. 22, 1998, entitled Carriage and Actuator Assembly, incorporated herein by reference. The mounting system of the present invention, however, may be used with other types of carriages and actuators and in other tape drives. The components of tape drive 10 shown and described herein, therefore, illustrate only one embodiment of the invention.

Referring to FIGS. 2–4, head 18 includes magnetic head elements, designated generally by reference number 23, affixed to a head carrier 24. Head 18 may be formed as an integral unit or as discrete components. A read/write "head" is sometimes used in the tape drive industry to refer to only that portion of the head assembly that includes the operative head elements. "Head" is also used to refer to the entire head sub-assembly which, in the context of FIGS. 2–4, includes head elements 23 and carrier 24. It is not important to the invention whether the read/write head 18 is considered an integrated component, a stand alone component, or a sub-assembly as long as the mounting features of the invention described below are present. Therefore, head 18 is to be construed broadly to include any of the various types of read and/or write head elements and components used in a tape drive.

As shown in application Ser. No. 09/102,703, carriage 26 moves up and down on bearings 30 along a pair of guide rails at the urging of a motor. Head 18, which is carried by carriage 26, therefore, also moves up and down in a direction perpendicular to the direction of tape travel as desired to properly position head 18 for reading and writing operations.

Head 18 is mounted to a front face 32 of carriage 26. Head 18 is pulled into an inside corner 34 formed in or along the face 32 of carriage 26. In this embodiment, and as best seen in FIG. 2, inside corner 34 is formed at the 90° intersection of face 32 and rectangular blocks 36 that project out from face 32. A 90° outside corner 38 formed in or along a rear face 40 of head 18 fits into inside corner 34 when head 18 is mounted to carriage 26. In this embodiment, and as best seen in FIG. 4, outside corner 38 is formed at the intersection of rear face 40 and sidewall 42 of head 18.

Head 18 is fastened to carriage 26 with screws 44. Screws 44 extend through holes 46 in head 18 into threaded holes 48 in the front face 32 of carriage 26. Screws 44 are angled toward inside corner 34 to pull head 18 into inside corner 34. Screws 44 and threaded holes 48 represent generally any threaded fastener. As screws 44 are tightened, outside corner 38 on head 18 is drawn tightly into inside corner 34 to help block any movement of head 18 and head 18 in the azimuth direction, which is indicated by arrows A in FIG. 3. Since head 18 is preloaded into a corner, the azimuthal rotation of head 18 as stresses are relieved due to temperature cycling or aging will be minimized or eliminated. It may be beneficial to lubricate the interface between head 18 and carriage 26 to further reduce any tendency of the head 18 to shift over time. Lubricating this interface will help ensure that head 18 will slide on carriage 26 as screws 44 are torqued until head 18 is seated properly into corner 34.

Figure 5A:
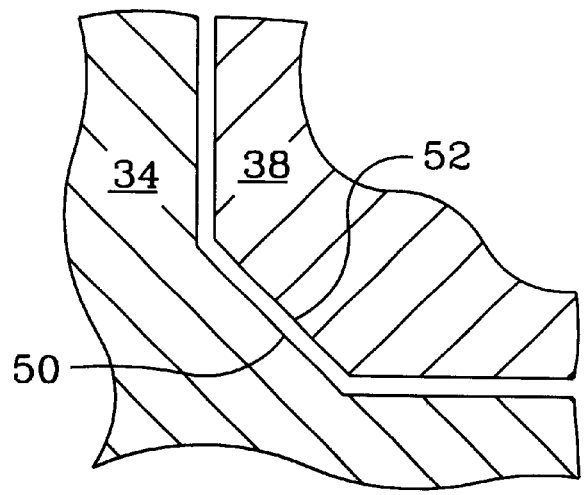
FIG. 5A is partial section detail view showing one embodiment in which the inner area of the inside corner and the outer area of the outside corner are chamfered.
Figure 5B:
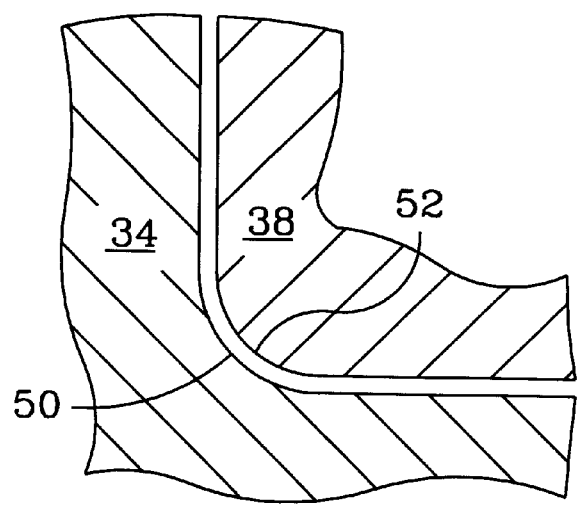
FIG. 5B is partial section detail view showing one embodiment in which the inner area of the inside corner and the outer area of the outside corner are curved.

Although the invention has been shown and described with reference to a corner mounting system that minimizes head rotation in the azimuth direction, the corner mounting system of the present invention might also be used to stabilize the head in other directions. Also, the position, size and shape of the mating corners on the head and the carriage shown in the drawings and described above is just one configuration for the corner mounting system. Other configurations are possible. For example, an inner area 50 of inside corner 34 and an outer area 52 of outside corner 38 may be chamfered or curved as shown in the section views of FIGS. 5A and 5B. The inside and outside corners could extend the full height of the head and carriage faces and the corners could be formed at various angles other than 90°. Therefore, "corner" as used in this Specification and in the Claims is to be construed broadly to include all manner of areas formed at the intersection of adjacent sides or edges. These and other variations of and modifications to the embodiments shown and described may be made without departing from the spirit and scope of the invention as defined in following claims.

What is claimed is:

1. An apparatus for mounting a tape drive head to a carriage, comprising:

an inside corner on one of the head or the carriage;

a mating outside corner on the other of the head or the carriage, the inside and outside corners configured to fit together when the head is fastened to the carriage; and a threaded fastener, a through hole in one of the head or the carriage and a threaded hole in the other of the head or the carriage, the hole in the carriage aligned with the hole in the head when the head is mounted to the carriage and the threaded hole angled toward the inside corner, the fastener and holes thereby configured to pull one of the inside corner or the outside corner into the other of the inside corner or the outside corner as the head is fastened to the carriage.

2. A head carriage assembly, comprising:

a carriage;

a head mounted to the carriage;

an inside corner on the carriage;

an outside corner on the head, the inside and outside corners configured to fit together when the head is fastened to the carriage; and a threaded fastener, a through hole in the head and a threaded hole in the carriage, the hole in the head aligned with the hole in the carriage when the head is mounted to the carriage, the fastener and holes thereby configured to pull the outside corner into the inside corner as the head is fastened to the carriage.

3. The assembly according to claim 2, wherein the carriage includes a front face and the head includes a rear face, the inside corner formed along the front face of the carriage and the outside corner formed along the rear face of the head.

4. The assembly according to claim 3, further comprising a rectangular block disposed along the front face of the carriage and a sidewall intersecting the rear face of the head, wherein the inside corner is formed at an intersection of the block and the front face of the carriage and the outside corner is formed at an intersection of the sidewall and the rear face of the head.

5. The apparatus according to claim 2, wherein at least one of the inside and outside corners are lubricated.

6. The apparatus according to claim 2, wherein the fastener is angled toward the inside corner.

7. A head carriage assembly, comprising:

a carriage;

a head mounted to the carriage;

an inside corner on the carriage;

an outside corner on the head, the inside and outside corners configured to fit together when the head is fastened to the carriage; and a threaded fastener, a through hole in the carriage and a threaded hole in the head, the hole in the head aligned with the hole in the carriage when the head is mounted to the carriage, the fastener and holes thereby configured to pull the outside corner into the inside corner as the head is fastened to the carriage.

* * * * *